US008832206B2

(12) United States Patent
Bhagat et al.

(10) Patent No.: US 8,832,206 B2
(45) Date of Patent: Sep. 9, 2014

(54) EMAIL RECIPIENT BEHAVIOR TRACKING

(75) Inventors: Dirk Bhagat, Toronto (CA); Annie Perrier, Mississauga (CA)

(73) Assignee: Hostopia.com Inc., Fort Lauderdale, FL (US)

( * ) Notice: Subject to any disclaimer, the term of this patent is extended or adjusted under 35 U.S.C. 154(b) by 972 days.

(21) Appl. No.: 12/705,227

(22) Filed: Feb. 12, 2010

(65) Prior Publication Data

US 2010/0211648 A1    Aug. 19, 2010

Related U.S. Application Data

(60) Provisional application No. 61/152,632, filed on Feb. 13, 2009.

(51) Int. Cl.
  *G06F 15/16*   (2006.01)
  *G06F 15/173*  (2006.01)
  *H04L 12/58*   (2006.01)

(52) U.S. Cl.
  CPC .................... *H04L 12/5885* (2013.01); *H04L 51/34* (2013.01)
  USPC ........................................... 709/206; 709/224

(58) Field of Classification Search
  USPC .......................................................... 709/206
  See application file for complete search history.

(56) References Cited

U.S. PATENT DOCUMENTS

| | | | |
|---|---|---|---|
| 6,018,619 A * | 1/2000 | Allard et al. | 709/224 |
| 6,854,007 B1 | 2/2005 | Hammond | |
| 7,007,067 B1 | 2/2006 | Azvine et al. | |
| 7,130,808 B1 | 10/2006 | Ranka et al. | |
| 2002/0032602 A1 | 3/2002 | Lanzillo, Jr. et al. | |
| 2004/0254994 A1 | 12/2004 | Diorio et al. | |
| 2005/0015482 A1 | 1/2005 | Blankenship | |
| 2005/0154728 A1 * | 7/2005 | Greve | 707/9 |
| 2006/0161511 A1 | 7/2006 | Berstis et al. | |
| 2007/0038717 A1 | 2/2007 | Burkholder et al. | |
| 2008/0068736 A1 | 3/2008 | Araki | |
| 2008/0133685 A1 | 6/2008 | Boss et al. | |
| 2008/0215686 A1 * | 9/2008 | Meredith et al. | 709/206 |
| 2008/0228891 A1 | 9/2008 | Cama | |
| 2009/0019127 A1 | 1/2009 | Cama | |

FOREIGN PATENT DOCUMENTS

| | | |
|---|---|---|
| WO | WO-02/17079 A2 | 2/2002 |
| WO | WO-2010093469 A1 | 8/2010 |

OTHER PUBLICATIONS

"International Application Serial No. PCT/US2010/000413, Written Opinion mailed Jun. 10, 2010", 9 pgs.
"International Application Serial No. PCT/US2010/000413, Search Report mailed Jun. 10, 2010", 5 pgs.

(Continued)

*Primary Examiner* — Shirley Zhang
*Assistant Examiner* — Angela Nguyen
(74) *Attorney, Agent, or Firm* — Schwegman Lundberg & Woessner, P.A.

(57) ABSTRACT

A system in which a message from a server is transmitted to a recipient device, the message including an image reference that identifies the location of an image. A request is received for the image file from the recipient device. The image file is transmitted to the recipient device and a start time of the transmitting is noted. Upon detecting that the image file has ceased being transmitted, an end time of the transmission is noted. The end time and start time are compared to make a determination of whether the message was read.

20 Claims, 5 Drawing Sheets

(56) References Cited

OTHER PUBLICATIONS

Anonymous, "Web bug", Retrieved from the InternetURL:http://web.archive.org/web/, 20071103112651/http://en.wikipedia.org/wikilWeb_bug [retrieved on May 19, 2010], XP002583117., (Nov. 3, 2007).

"International Application Serial No. PCT/US2010/000413, International Preliminary Report on Patentability mailed Aug. 25, 2011", 9 pgs.

* cited by examiner

EMAIL RECIPIENT BEHAVIOR TRACKING

CROSS-REFERENCE TO RELATED APPLICATIONS

This application claims the priority of U.S. Provisional Application Ser. No. 61/152,632, filed Feb. 13, 2009, which is incorporated herein by reference in its entirety.

BACKGROUND

E-mail and other forms of electronic communication are used by businesses and others for sending, among other items, newsletters and promotional materials. Determining whether or not a person has read an e-mail may be useful in modifying the newsletter and determining the efficacy of any promotion.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

The following detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Retailers, marketers, and other companies use e-mail as a mechanism to send promotional materials and other information to current and potential customers. Measuring the efficacy of the sent e-mails may take many forms. For example, consider hypothetical company ABC sending a marketing newsletter over e-mail to one or more e-mail addresses. Quantifiable data is collected that includes, but is not limited to, how many e-mail messages were sent, how many e-mails messages were returned as undeliverable (e.g., invalid e-mail addresses), and how many e-mails messages were opened. Sometimes data about the number of links clicked in the e-mail (if any are present) and the time they were clicked is collected. Oftentimes the data collected is insufficient to determine whether or not an e-mail message was actually read. For example, the data may not distinguish between a person who has opened an e-mail message for one second and a person who has opened an e-mail message for ten seconds.

Figure 1:
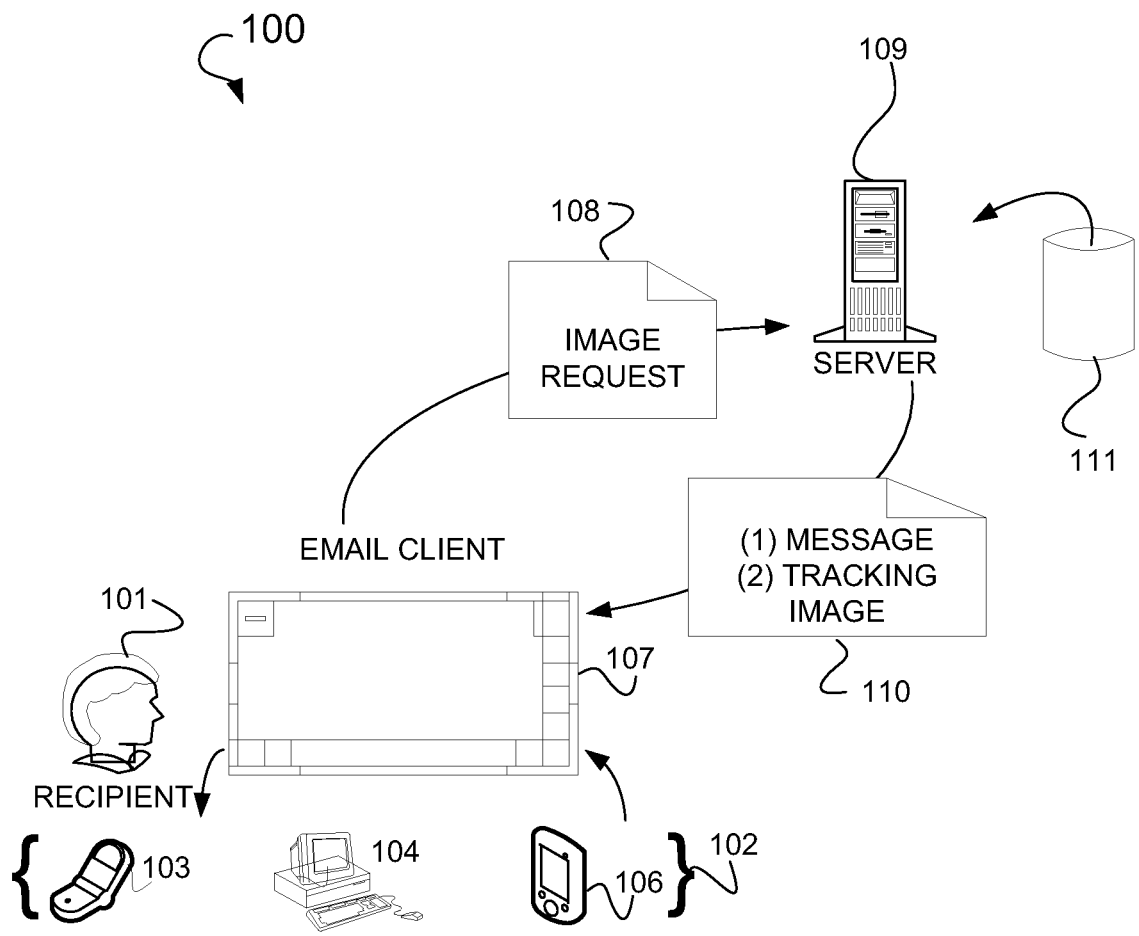
FIG. 1 is a network diagram illustrating a system, according to one embodiment of the present subject matter.

In the present application, apparatus and methods are developed to more accurately determine if an e-mail message has been read. In various embodiments, the use of one or more image references combined with knowledge of timing of the retrievals of one or more associated image files provides basic information as to whether the email was likely read or just opened and discarded too rapidly to have been read by the recipient. FIG. 1 illustrates a system 100 which is an environment upon which the present invention can operate, according to one embodiment of the present subject matter. Recipient 101 is the user of an e-mail client residing on any of a number of recipient e-mail devices. These devices 102 may include, but are not limited to, for example, a cell phone 103, a computer 104, and/or a Personal Digital Assistant (PDA) 106. In an embodiment, e-mail client 107 is configured to send and receive e-mail messages using one or more protocols such as the Simple Mail Transfer Protocol (SMTP), Post Office Protocol (POP), and Internet Message Access Protocol (IMAP). Other e-mail clients may be used without departing from the scope of the present subject matter. E-mail clients run on, and are displayed on, the recipient device and are used to receive and view e-mail messages (e.g., desktop e-mail clients such as Microsoft Outlook and web-based e-mail clients such as Google GMail, to name only a few).

In various applications, server 109 is configured as a web server. In one embodiment, server 109 is an image server. In one embodiment, server 109 is an e-mail server. In various embodiments, server 109 can be any combination of servers, including, but not limited to those stated herein. Database 111 is in communication with server 109 and is used to store records associated with communications to and from server 109. In various embodiments, system 100 utilizes a plurality of servers and/or a plurality of databases. Server 109 is shown as in communication with one or more recipient devices 102 via a network such as the INTERNET. Server 109 transmits e-mail messages 110 (see e.g., FIG. 2) that include the message contents and a tracking image reference. Upon opening message 110, e-mail client 107 transmits image request 108 using the tracking image reference to server 109 for retrieval of the tracking image file.

Figure 2:
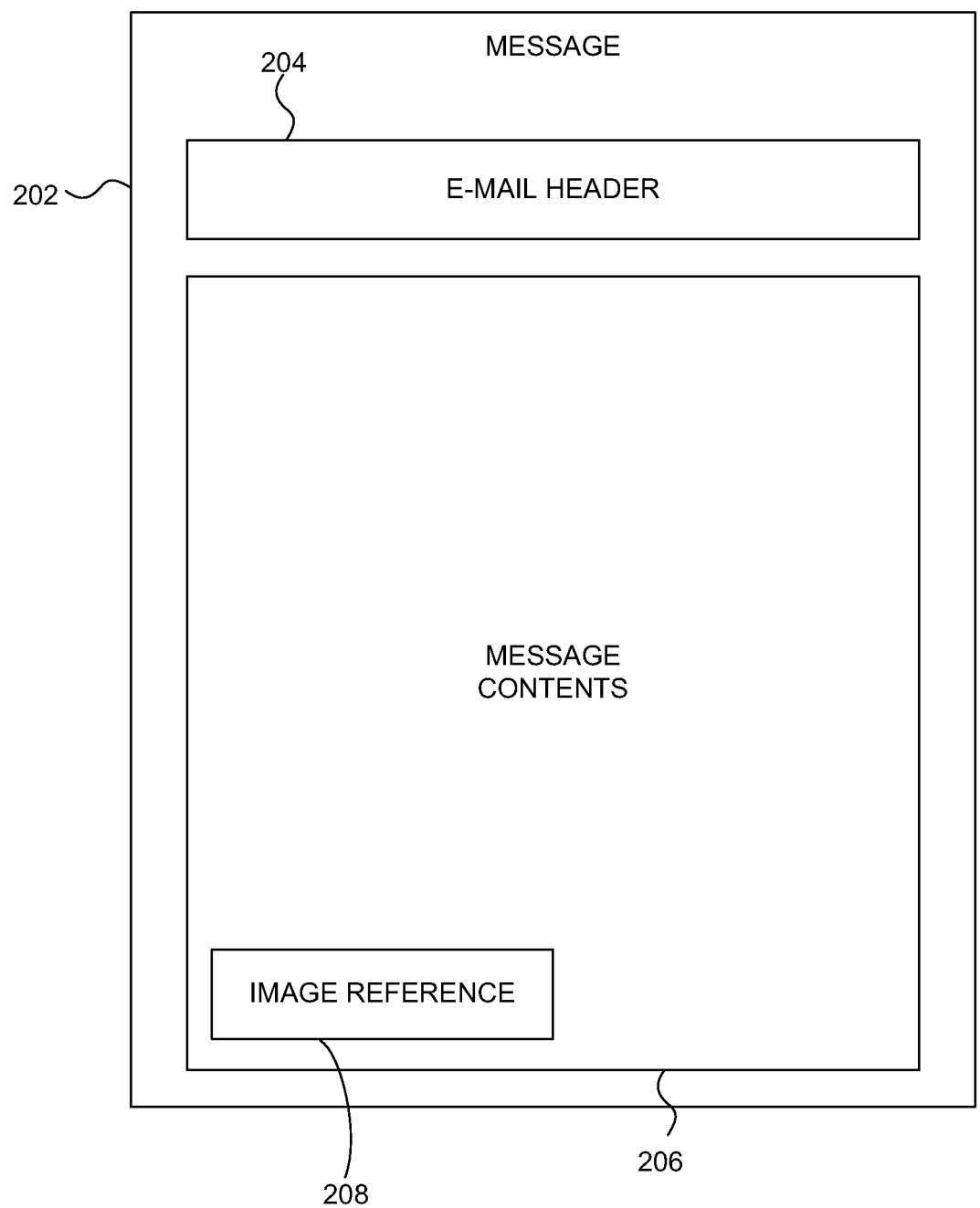
FIG. 2 is a block diagram of a message, according to one embodiment of the present subject matter.

FIG. 2 illustrates message 202 according to one embodiment of the present subject matter. Message 202 includes email header 204 (e.g., RFC 822, RFC 2822, RFC 4021, RFC 5322, and RFC 2076) and message contents 206 which include one or more tracking image references 208. In one embodiment, an e-mail message transmitted from the one or more servers is formatted according to the HyperText Markup Language (HTML). HTML allows a person formatting the message to include additional elements beyond text in the message. For example, images and links to web pages may be included in the message. In an embodiment, one or more image references 208 are used to track how long an e-mail message is open. If the message is open past a threshold time, the e-mail is determined to have been read. If the e-mail is open less than the threshold time or not opened at all, it is determined to not have been read. In various embodiments, the threshold time can be changed to provide better tracking of openings depending on things such as message content and estimated image download time.

Figure 3:
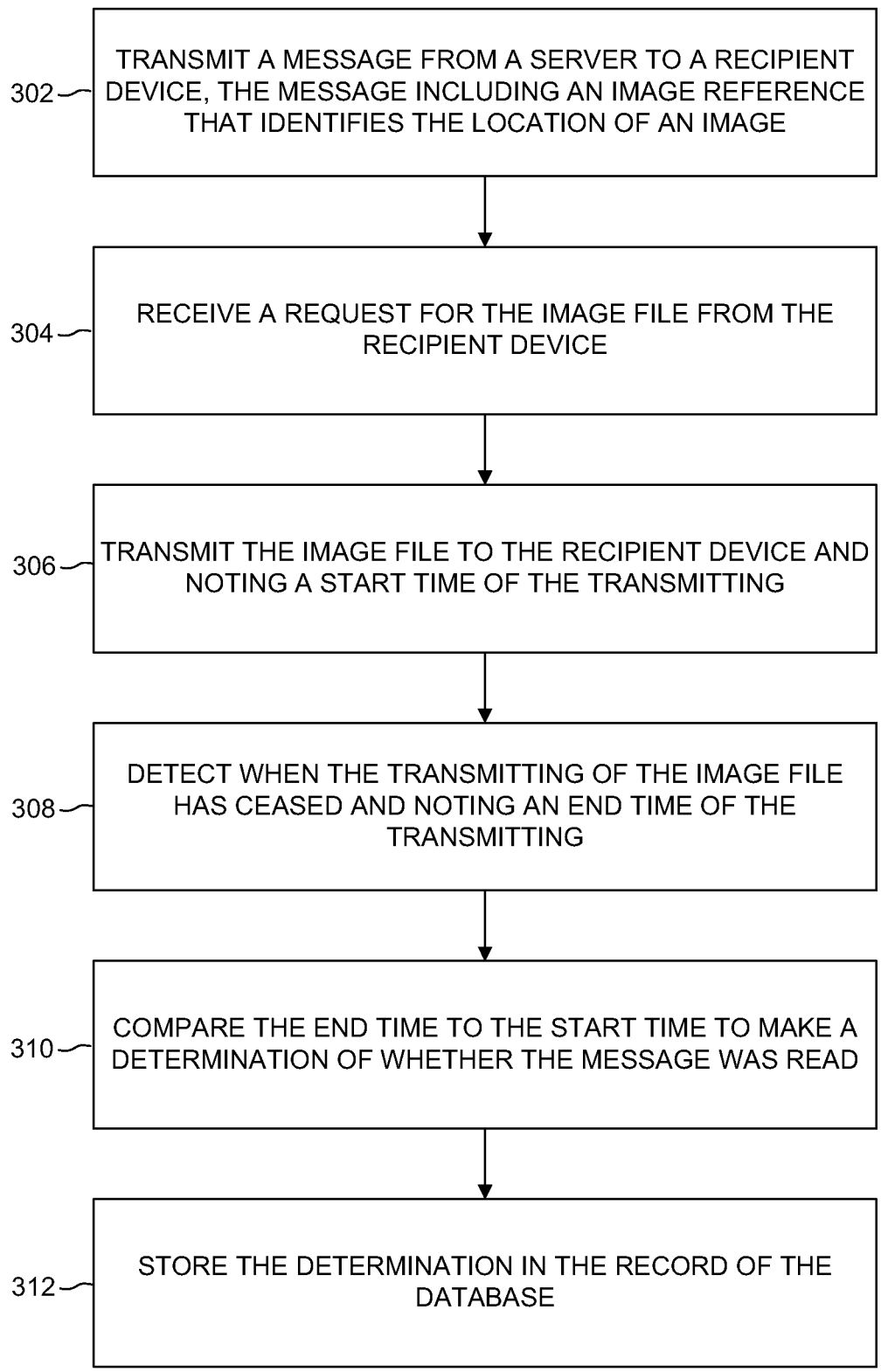
FIG. 3 is a flow diagram of a process for determining whether an email was read using an image, according to one embodiment of the present subject matter.

FIG. 3 is a flow diagram of a process for determining whether an email was read using an image, according to one embodiment of the present subject matter. In one embodiment, the message is transmitted from the server to the recipient device (302). The message includes a reference to the image file that is used for tracking reading times of the message. The reference includes a location of the image file. In various embodiments, additional code may be included to gather information from the recipient device, including, but not limited to, one or more of the type of e-mail client used, the type of computer, time opened, IP address of the recipient device, and other information associated with the recipient device.

Upon receipt of a request for the image file from the recipient device (304), a start time is noted and the image file transmission is initiated (306). The notation of the start time can be performed in a variety of ways including, but not limited to, storing the start time in a register or other storage, or initiating a counting procedure which completes upon termination of the transmission.

The server detects when the transmitting of the image file has ceased and notes an end time for the transmission (308). In an embodiment there are two termination modes: the transmission has completed or the user aborted the request. During the image transmission, verification is done to determine if the client is still connected. In some embodiments, the client may stop the transmission by various means, such as closing the e-mail message, closing the email client or shutting down their operating system. These will be considered as if the client aborted the request. If the response is transmitted to the client in full, the transmission is considered complete.

The start time and end time are compared to determine whether the message was open long enough to be considered read by the user of the recipient device (310). It is noted that a threshold time can be used which may vary depending on the message and expected download time of the image file (or image files). The determination is then stored in a database and associated with the recipient device and optionally with any other pertinent information (312). Other forms of storage may be used such as a flat file or individual reports for each message.

Figure 4:
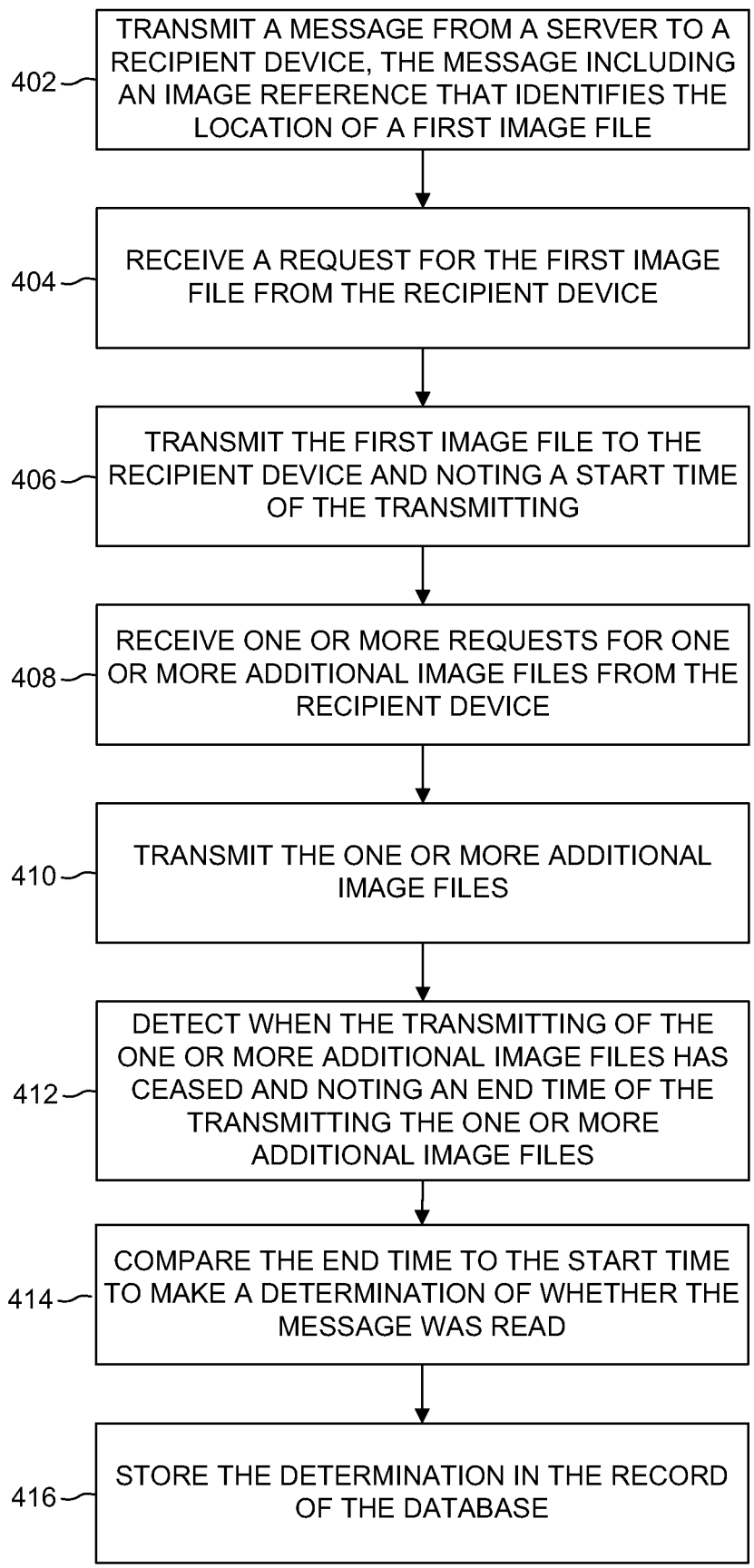
FIG. 4 is a flow diagram of a process for determining whether an email was read using a plurality of images, according to one embodiment of the present subject matter.

FIG. 4 is a flow diagram of a process for determining whether an email was read using a plurality of images, according to one embodiment of the present subject matter. In one embodiment, the message is transmitted from the server to the recipient device (402). The message includes a reference to a first image file that is used for tracking reading times of the message. The reference includes a location of the first image file. In various embodiments, additional code may be included to gather information from the recipient device, including, but not limited to, one or more of the type of e-mail client used, the type of computer, time opened, IP address of the recipient device, and other information associated with the recipient device.

Upon receipt of a request for the image file from the recipient device (404), a start time is noted and the image file transmission is initiated (406). The notation of the start time can be performed in a variety of ways including, but not limited to, storing the start time in a register or other storage, or initiating a counting procedure which completes upon termination of the transmission.

One or more additional image file requests can occur and result in further known delays associated with the downloading of the one or more additional image files (408). The requested additional image or images are sent (410). For each image embedded in the e-mail message, the e-mail client will request the image from the server.

In an embodiment, browsers and e-mail clients are configured to timeout an HTTP request after a predefined time interval. Depending on the client, one or many images will be requested simultaneously. As a result, in an embodiment, tracking images are not set to transmit indefinitely or for an extended period of time. Multiple tracking images are used in place of a single image in the message. Each image is tracked and time combined to produce a final start and end time. Clients will have a maximum number of concurrent requests, for example: 2. The first 2 images will be downloaded by the client. Only once these images have completed downloading will be client request the next 2 images. The use of multiple images allows for timing for longer periods than the e-mail client's timeout interval (e.g., 30 seconds by default). Each image can complete their transmission within the e-mail client timeout window and the start time of the first image(s) and end time of the last image(s) can provide the start and end time of the viewed message.

The server detects when the transmitting of the image files has ceased and notes an end time for the transmission (412). In an embodiment there are two termination modes: the transmission has completed or the user aborted the request. During the image transmission, verification is done to determine if the client is still connected. In some embodiments, the client may stop the transmission by various means, such as closing the e-mail message, closing the email client or shutting down their operating system. These will be considered as if the client aborted the request. If the response is transmitted to the client in full, the transmission is considered complete.

The start time and end time are compared to determine whether the message was open long enough to be considered read by the user of the recipient device (414). It is noted that a threshold time can be used which may vary depending on the message and expected download time of the image file (or image files). The determination is then stored in a database and associated with the recipient device and optionally with any other pertinent information (416).

In some embodiments, link clicks, and read receipts are used combination with the image method described above to accurately predict whether a user has read an e-mail message. In a web browser, JavaScript code can be executed when a user enters and exits a web page and record the time of each event. However, most e-mail clients disable the use of JavaScript for security reasons. Further, some virus scanners block messages that include JavaScript. Thus, in some embodiments, JavaScript cannot be used in e-mail messages as an accurate tracking method.

In one embodiment, the tracking of recipient activity is accomplished by tracking clicks to links that are included in the e-mail message. When a recipient clicks a link in an e-mail, the requested page first tracks the time, user, and clicked link before directing the user to the requested location. If a user clicks multiple links in a message, it is possible to estimate how long a user may have spent reading the message. However, this method relies on user action. In some embodiments users will not click on the links or he or she will copy and paste the link into an external browser. In these cases, the e-mail server could not determine if a user has actually read a message. A further requirement is that the message includes links.

In one embodiment, messages include a read receipt. A request to send the read receipt is presented by the e-mail client to the recipient. Recipients acknowledge or deny the request. If they acknowledge, a receipt is sent to the sender indicating that the recipient has received the e-mail message. The time of the receipt is determined from the receipt message. If the recipient denies the request, no receipt will be received by the sender. In a business setting among a trusted group of friends, read receipts are a tool to help determine if a person has read the message, but in a mass mailing scenario the accuracy of such a determination decreases. In some embodiments, mail clients are configured to automatically reject all such requests. Further, a recipient may send the read receipt, but then not read the message.

Figure 5:
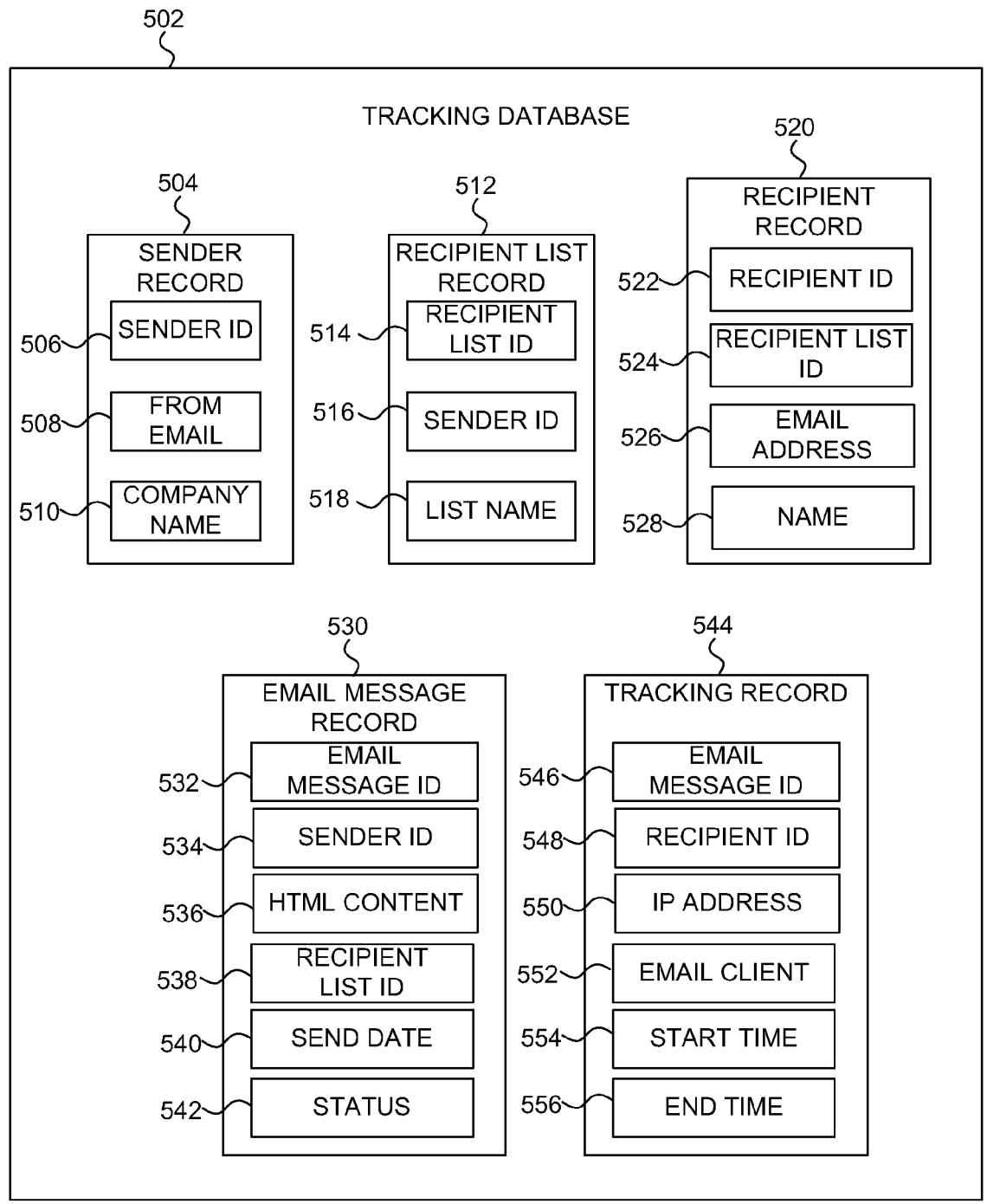
FIG. 5 is a block diagram of a tracking database, according to one embodiment of the present subject matter.

FIG. 5 illustrates a database 502, with one or more sender records 504, recipient list records 512, recipient records 520, email message records 530, and tracking records 544. In one embodiment, database 502 is utilized to store information associated with the system described herein. In an embodiment, sender record 504 includes sender ID 506, from email 508, and company name 510 fields. In an embodiment recipient list record 512 includes recipient list ID 514, sender ID 516, and list name 518 fields. In an embodiment, recipient record 520 includes recipient ID 522, recipient list ID 524, email address 526, and name fields. In an embodiment, email message record 530 includes email message ID 532, sender ID 534, HTML content 536, recipient list ID 528, send date 540, and status 542 fields. In an embodiment, tracking record 544 includes email message ID 546, recipient ID 548, IP address 550, email client 552, start time 554, and end time 556 fields.

In an embodiment each user of the system sending messages has a sender record 504. In an embodiment the sender creates one or more lists of recipients with an associated recipient list record 512. The recipient list record belongs to the sender. In an embodiment, the sender uses an input device to input all recipients with each recipient, at minimum, including en e-mail address 526. Other personal information may be stored as well (e.g., name 528, address, profession). Recipient records 520 are created for reach recipient. In various embodiments, recipient record 520 belongs to one recipient list record 512, which in turn belongs to a sender record 504.

In some embodiments, for each email a Sender creates, an Email Message Record 530 is created. An Email Message is linked to a Recipient List 512 indicating who to send the message to. When a Recipient opens a message, an entry is added to a Tracking Record 544. In an embodiment, only opened emails sent to valid email addresses will appear in this table. Invalid email addresses can be tracked by email bounces returned to the server. In some embodiments, unopened emails are the Recipient Record 520 entries which are tied to the Recipient List 512 for the Email Message 530 that are not a) not recorded as bounced, b) do not have any Tracking Record for the Email Message. In an embodiment, it is not necessary to store that a message has been "read", as this will be determined dynamically by selecting entries which have a view time longer than the threshold. The threshold can be changed at any time or based on the content in order to obtain different data sets.

In one embodiment, one or more small images (1 pixel by 1 pixel) are included at the end of the e-mail message to determine how long a message is open (see e.g., FIG. 2). If HTML is used, the formatting at the end of the message is:

<img src="[URL]"/>

In some embodiments, the image is not considered to part of the content of the message that is intended to be read and is either invisible or inconspicuous to the recipient. When a message is opened on a recipient device, an e-mail client will submit an HTTP request for the image from an image server where it is hosted according to the Uniform Resource Locator (URL). In an embodiment, the image server and e-mail server that originated the e-mail are located in the same server (e.g., a web server). Upon receiving the request from the recipient device, the image server will identify the recipient device and when the request was made. In an embodiment, this is done through the use of a dynamic script that is used in place of the URL. For example, the URL in the HTML image tag can be formatted as: http://domain.com/tackingimage.php?recipientid=1234. The trackingimage.php script can store the recipient id along with the request time in a database. The script can return the content of an image in an HTTP response with the appropriate content type (ex: "image/gif" or "image/jpg"). The script can be written in any web programming language which the server can execute.

In one embodiment, the script is configured to transmit images at an extremely slow rate. For example, a 1×1 pixel images of a few hundred bytes can be transmitted one byte every few seconds (e.g., 5 seconds). The file size of a 1×1 pixel image can be purposely increased in order to increase transmission time (methods of image file size increase include but are not limited to: eliminating image compression when saving the image and adding comments to image). In this manner the length of time a communication link is established between a recipient device and an image server is used to determine how long a message is open. In an embodiment, the tracking image script is configured to execute in a predetermined amount of time that represents the threshold amount of time an e-mail message needs to be open to be considered read.

In some embodiments, the system is configured to address caching, timing accuracy, client support, blocked images, maximum image transmission time, and false extended viewing time. E-mail clients may cache the images included in the e-mail message. Using cached images does not require transmitting an HTTP request to the image server thereby having the potential for a recipient to read an e-mail message, but not be counted as having read the message. In some embodiments, precautions are taken to ensure the tracking image is not cached. For example the header of the HTTP request will indicate not to cache the document and use an expiration date in the past:

Cache-Control: no-cache

Expires: Thu, 1 Dec. 1994 16:00:00 GMT

In some embodiments, the time between which the recipient has dropped the connection and the end time is measured by taking into account application run time timing intervals, and aborted connection time. For example, the application can check for an aborted connection at shorter time interval than it uses for transmitting image data.

Another possible concern is that e-mail clients are configured to block all images and thereby not invoke the image tracking script. In some embodiments, recipients with e-mail clients that block images are considered to not have read the e-mail message. This is often an accurate representation as many newsletters include images that are integral to proper reading of the e-mail. If a recipient is not viewing the images, it may be assumed he or she is not reading the newsletter.

When a recipient opens a message and diverts their attention and fails to actually read the message, but does not close the message, the system, in one embodiment, considers the message read. Data collected in addition to image tracking data is used to further determine the recipient's actions. For example, link clicks are used to determine when a recipient may have stopped looking at the e-mail message.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method, comprising:

transmitting a message from a server to a recipient device, the message including an image reference that identifies the location of an image file;

receiving a request for the image file from the recipient device;

recording a start time at a beginning of transmitting the image file to the recipient device;

recording an end time upon detection of an end of transmitting of the image file;

computing a difference between the end time and the start time; and comparing the difference to a threshold to make a determination of whether the message was read.

2. The method of claim 1, wherein the image reference is accompanied with code used to identify information associated with the recipient device.

3. The method of claim 1, wherein the image file is not visible in the message.

4. The method of claim 1, wherein the image file is transmitted at a rate equal or greater to the time estimated to read the message.

5. The method of claim 1, wherein if the difference is more than the threshold, then determining that the message was read.

6. The method of claim 1, wherein if the difference is less than the threshold, then determining that the message was not read.

7. The method of claim 2, wherein the information includes an internet protocol address of the recipient device.

8. The method of claim 2, wherein the information includes an e-mail client used on the recipient device to retrieve the message.

9. The method of claim 4, wherein the image file is not loaded from a cache stored on the recipient device.

10. A method, comprising:

transmitting a message from a server to a recipient device, the message including an image reference that identifies the location of a first image file;

receiving a request for the first image file from the recipient device;

recording a start time at a beginning of transmitting the first image file to the recipient device;

receiving one or more requests for one or more additional image files from the recipient device;

transmitting the one or more additional image files;

recording an end time upon detection of an end of transmitting of the one or more additional image files;

computing a difference between the end time and the start time; and comparing the difference to a threshold to make a determination of whether the message was read.

11. The method of claim 10, wherein the image reference is accompanied with code used to identify information associated with the recipient device.

12. The method of claim 10, wherein the first image file is not visible in the message.

13. The method of claim 10, wherein the first image file is transmitted at a rate equal or greater to the time estimated to read the message.

14. The method of claim 10, wherein if the difference is more than the threshold, then determining that the message was read.

15. The method of claim 10, wherein if a difference between the start time and the end time is less than a predetermined threshold, then determining that the message was not read.

16. The method of claim 10, comprising storing the determination in a record of a database.

17. The method of claim 11, wherein the information includes an internet protocol address of the recipient device.

18. The method of claim 11, wherein the information includes an e-mail client used on the recipient device to retrieve the message.

19. The method of claim 13, wherein the first image file is not loaded from a cache stored on the recipient device.

20. The method of claim 16, wherein storing the determination in a record of a database comprises associating the determination with the recipient device.

* * * * *